United States Patent
Otake et al.

(10) Patent No.: US 12,509,602 B2
(45) Date of Patent: *Dec. 30, 2025

(54) DISPERSION RESIN AND DISPERSION LIQUID AND INK USING THE SAME

(71) Applicant: SEIKO EPSON CORPORATION, Tokyo (JP)

(72) Inventors: Toshihiro Otake, Chino (JP); Hiroshi Ito, Matsumoto (JP); Harunobu Komatsu, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 141 days.

This patent is subject to a terminal disclaimer.

(21) Appl. No.: 18/494,807

(22) Filed: Oct. 26, 2023

(65) Prior Publication Data
US 2024/0141189 A1 May 2, 2024

(30) Foreign Application Priority Data
Oct. 27, 2022 (JP) .................. 2022-172117

(51) Int. Cl.
| | | |
|---|---|---|
| C09D 11/30 | (2014.01) | |
| B41J 2/01 | (2006.01) | |
| B41J 2/21 | (2006.01) | |
| C09D 11/107 | (2014.01) | |
| C09D 11/328 | (2014.01) | |
| C09D 11/38 | (2014.01) | |

(52) U.S. Cl.
CPC .............. C09D 11/30 (2013.01); B41J 2/01 (2013.01); B41J 2/2107 (2013.01); C09D 11/107 (2013.01); C09D 11/328 (2013.01); C09D 11/38 (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 5,231,131 A | 7/1993 | Chu et al. | |
| 5,708,095 A | 1/1998 | Grezzo Page et al. | |
| 5,969,033 A | 10/1999 | Pearlstine | |
| 6,660,793 B1 | 12/2003 | McIntyre et al. | |
| 7,332,532 B2 | 2/2008 | Vasudevan | |
| 10,717,292 B2 | 7/2020 | Sato et al. | |
| 12,305,068 B2 * | 5/2025 | Kakishita | C09D 11/38 |
| 2005/0153123 A1 | 7/2005 | Herfert et al. | |
| 2005/0228071 A1 | 10/2005 | Vasudevan | |
| 2010/0204382 A1 | 8/2010 | Evstatieva et al. | |
| 2011/0288209 A1 | 11/2011 | Beck et al. | |
| 2012/0287201 A1 | 11/2012 | Lozman et al. | |
| 2014/0066352 A1 | 3/2014 | Wang et al. | |
| 2014/0275460 A1 | 9/2014 | Tamareselvy et al. | |
| 2019/0177561 A1 | 6/2019 | Koyanagi et al. | |
| 2019/0309180 A1 * | 10/2019 | Tanaka | B41M 5/00 |

(Continued)

FOREIGN PATENT DOCUMENTS

| | | |
|---|---|---|
| EP | 1707606 A1 | 10/2006 |
| JP | H10-502097 A | 2/1998 |

(Continued)

OTHER PUBLICATIONS

"Methacrylates." NOF Europe, nofeurope.com/speciality-chemicals/specialty-monomers/methacrylates/. Accessed Aug. 25, 2023. (Year: 2023) 5 Pages.

*Primary Examiner* — Manish S Shah

(74) *Attorney, Agent, or Firm* — Harness, Dickey & Pierce, P.L.C.

(57) ABSTRACT

A dispersion liquid includes water, a coloring material, and a dispersion resin that disperses the coloring material, and the dispersion resin has a constituent unit A containing a hydrophobic monomer, a constituent unit B containing an unsaturated aliphatic dicarboxylic acid monomer, and a constituent unit C containing an acrylamide monomer having a sulfonic acid group. The weight-average molecular weight of the dispersion resin is from 10,000 to 100,000, the content of the constituent unit A is 40 mol % or more relative to the total amount of the dispersion resin, and the content of the constituent unit B is 4 mol % or more relative to the total amount of the dispersion resin.

8 Claims, No Drawings

(56) References Cited

U.S. PATENT DOCUMENTS

| | | | |
|---|---|---|---|
| 2020/0255570 A1* | 8/2020 | Van Gaens | C09D 11/326 |
| 2021/0292586 A1 | 9/2021 | Nagano et al. | |
| 2022/0008989 A1 | 1/2022 | Hattanda | |
| 2022/0025204 A1* | 1/2022 | Otake | C09D 11/326 |
| 2022/0089890 A1* | 3/2022 | Tojino | C09D 11/328 |
| 2022/0154021 A1* | 5/2022 | Terao | C09D 11/102 |
| 2022/0154022 A1* | 5/2022 | Terao | C09D 11/32 |
| 2022/0162367 A1* | 5/2022 | Tojino | C09D 11/328 |
| 2022/0186062 A1 | 6/2022 | Kakishita et al. | |

FOREIGN PATENT DOCUMENTS

| | | |
|---|---|---|
| JP | H10-087754 A | 4/1998 |
| JP | H11-246808 A | 9/1999 |
| JP | 2000273373 A | 10/2000 |
| JP | 2002-020678 A | 1/2002 |
| JP | 2005-298826 A | 10/2005 |
| JP | 2010-090191 A | 4/2010 |
| JP | 2010-229417 A | 10/2010 |
| JP | 2010-540761 A | 12/2010 |
| JP | 2012-167222 A | 9/2012 |
| JP | 2014-025067 A | 2/2014 |
| JP | 2014-534997 A | 12/2014 |
| JP | 2015-083684 A | 4/2015 |
| JP | 2015-533860 A | 11/2015 |
| JP | 2016-190916 A | 11/2016 |
| JP | 2017-002096 A | 1/2017 |
| JP | 2017-048361 A | 3/2017 |
| JP | 2017-075302 A | 4/2017 |
| JP | 2019-026741 A | 2/2019 |
| JP | 2020-007570 A | 1/2020 |
| JP | 2020-180210 A | 11/2020 |
| JP | 2022-020894 A | 2/2022 |
| JP | 2022-020902 A | 2/2022 |
| WO | 1994-021701 A1 | 9/1994 |
| WO | 2009-047233 A1 | 4/2009 |
| WO | 2013-067109 A1 | 5/2013 |
| WO | 2014-032267 A1 | 3/2014 |

* cited by examiner

DISPERSION RESIN AND DISPERSION LIQUID AND INK USING THE SAME

The present application is based on, and claims priority from JP Application Serial Number 2022-172117, filed Oct. 27, 2022, the disclosure of which is hereby incorporated by reference herein in its entirety.

BACKGROUND

1. Technical Field

The present disclosure relates to a dispersion resin and a dispersion liquid and ink using the same.

2. Related Art

An ink jet recording method is capable of recording high-definition images by a relatively simple apparatus, and rapid development is achieved in various fields. In particular, various investigations are carried out to obtain images with high quality while suppressing mist contamination of a recording head. For example, JP-A-2017-002096 discloses an ink for pigment ink jet recording, which contains pigment particles dispersed in a styrene-acrylic resin.

However, an ink composition containing a usual dispersant such as the styrene-acrylic resin described in JP-A-2017-002096 has a problem that once a coloring material is solidified due to drying of an ink, the ink composition is subsequently hardly re-dispersed, thereby easily causing failure during ejection, and a problem that dispersion stability is unsatisfactory when stored in a high temperature environment.

SUMMARY

According to an aspect of the present disclosure, a dispersion liquid includes water, a coloring material, and a dispersion resin which disperses the coloring material, the dispersion resin having a constituent unit A containing a hydrophobic monomer, a constituent unit B containing an unsaturated aliphatic dicarboxylic acid monomer, and a constituent unit C containing an acrylamide monomer having a sulfonic acid group. The weight-average molecular weight of the dispersion resin is from 10,000 to 100,000, the content of the constituent unit A is 40 mol % or more relative to the total amount of the dispersion resin, and the content of the constituent unit B is 4 mol % or more relative to the total amount of the dispersion resin.

According to an aspect of the present disclosure, an ink composition for ink jet recording includes the dispersion liquid described above, a surfactant, and a water-soluble organic solvent.

DESCRIPTION OF EMBODIMENTS

An embodiment of the present disclosure (referred to as a "present embodiment" hereinafter) is described in detail below, but the present disclosure is not limited to this, and various modifications can be made within a scope not deviating from the gist of the present disclosure.

1. Dispersion Liquid

A dispersion liquid according to the present embodiment includes water, a coloring material, and a dispersion resin which disperses the coloring material, the dispersion resin having a constituent unit A containing a hydrophobic monomer, a constituent unit B containing an unsaturated aliphatic dicarboxylic acid monomer, and a constituent unit C containing an acrylamide monomer having a sulfonic acid group. The weight-average molecular weight of the dispersion resin is from 10,000 to 100,000, the content of the constituent unit A is 40 mol % or more relative to the total amount of the dispersion resin, and the content of the constituent unit B is 4 mol % or more relative to the total amount of the dispersion resin.

A dispersion liquid or ink composition using a usual dispersion resin has the problem of being hardly re-dispersed once a coloring material is solidified and the problem of causing unsatisfactory dispersion stability when stored in a high-temperature environment. On the other hand, in the present embodiment, the solidified coloring material can be easily re-dispersed by using the dispersion resin having the configuration described above. Also, even when stored in a high-temperature environment, dispersion stability can be maintained. Each of the components is described in detail below.

1.1. Dispersion Resin

The dispersion resin according to the present embodiment is a copolymer having the constituent unit A containing a hydrophobic monomer, the constituent unit B containing an unsaturated aliphatic dicarboxylic acid monomer, and the constituent unit C containing an acrylamide monomer having a sulfonic acid group. In the present embodiment, the "monomer" represents a monomer having a polymerizable unsaturated bond before polymerization, and the "constituent unit" represents a repeating unit constituting a portion of the dispersion resin after polymerization. In the present embodiment, the term "hydrophobic" represents the property of being incompatible with water at 25° C., and the term "hydrophilic" represents the property of being compatible with water at 25° C.

The dispersion resin may be either a random copolymer or a block copolymer. Examples of the block copolymer include a triblock copolymer having a block A composed of the constituent unit A, a block B composed of the constituent unit B, and a block C composed of the constituent unit C; a diblock copolymer having a block A composed of the constituent unit A and a random block B/C composed of the constituent unit B and the constituent unit C; and the like. The use of such a dispersion resin tends to more improve re-dispersibility after solidification and more improve the dispersion stability during storage in a high-temperature environment.

The content of the dispersion resin relative to the total amount of the dispersion liquid is preferably from 2.5% to 10% by mass, from 2.7% to 8.0% by mass, or from 3.0% to 6.0% by mass. When the content of the dispersion resin is within the range described above, there is a tendency to more improve re-dispersibility after solidification and more improve the dispersion stability during storage in a high-temperature environment.

1.1.1. Constituent Unit A

The constituent unit A is a constituent unit containing a hydrophobic monomer and partially imparts hydrophobicity to the dispersion resin. Although not particularly limited, the constituent unit A may be aligned on the surface of the coloring material due to hydrophobic interaction or the like and thus can contribute to adsorption of the dispersion resin to the coloring material.

Examples of the hydrophobic monomer constituting the constituent unit A include, but are not particularly limited to, vinyl monomers having an aromatic group, such as styrene, methylstyrene, other styrene derivatives, and the like; and acrylic acid ester monomers having a hydrocarbon group, such as methyl (meth)acrylate, ethyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, 2-ethylhexyl (meth)acrylate, benzyl (meth)acrylate, and the like. Among these, styrene and benzyl (meth)acrylate are more preferred. The use of such a hydrophobic monomer tends to more improve the adsorptivity of the dispersion resin to the coloring material, more improve re-dispersibility after solidification, and more improve the dispersion stability during storage in a high-temperature environment. The hydrophobic monomers may be used alone or in combination of two or more. In the present embodiment, the "(meth)acrylate" includes acrylate and methacrylate.

The content of the constituent unit A relative to the total amount of the dispersion resin is 40 mol % or more, preferably from 40 to 90 mol %, from 50 to 90 mol %, or from 60 to 90 mol %. When the content of the constituent unit A is 40 mol % or more, the adsorptivity of the dispersion resin to the coloring material is more improved. Also, when the content of the hydrophobic constituent unit A is 40 mol % or more, the hydrophilicity of the dispersion resin itself is generally decreased, but water solubility of the dispersion resin of the present embodiment can be secured due to the contribution of another constituent unit, particularly the constituent unit C. Therefore, there is a tendency to more improve the adsorptivity of the dispersion resin to the coloring material, more improve re-dispersibility after solidification, and more improve the dispersion stability during storage in a high-temperature environment.

1.1.2. Constituent Unit B

The constituent unit B is a constituent unit containing an unsaturated aliphatic dicarboxylic acid monomer. Although not particularly limited, the constituent unit B is aligned on the side opposite to the surface of the coloring material. Also, the charge density on particle surfaces is increased by containing divalent dicarboxylic acid, and thus electrostatic repulsion between particles is strengthened. Therefore, aggregation of even a coloring material having strong aggregability can be suppressed, thereby enabling to contribute to improvement in dispersibility. In particular, dispersion stability during storage in a high-temperature environment tends to be significantly improved.

Examples of the unsaturated aliphatic dicarboxylic acid monomer constituting the constituent unit B include, but are not particularly limited to, itaconic acid, fumaric acid, maleic acid, citraconic acid, mesaconic acid, 3-hexenedioic acid, 3-octenedioic acid, dodecenylsuccinic acid, and the like. Among these, itaconic acid and fumaric acid are preferred. The use of the unsaturated aliphatic dicarboxylic acid monomer tends to more improve the adsorptivity of the dispersion resin to the coloring material, more improve re-dispersibility after solidification, and more improve the dispersion stability during storage in a high-temperature environment. The unsaturated aliphatic dicarboxylic acid monomers may be used alone or in combination of two or more.

The content of the constituent unit B relative to the total amount of the dispersion resin is 4 mol % or more, preferably from 4 to 40 mol %, from 4 to 37 mol %, or from 4 to 30 mol %. When the content of the constituent unit B is 4 mol % or more, there is a tendency to more improve re-dispersibility after solidification and more improve the dispersion stability during storage in a high-temperature environment. In addition, when the content of the constituent unit B is 40 mol % or less, the dispersion resin can be avoided from being made extremely water soluble, and adsorptivity to the coloring material can be secured.

1.1.3. Constituent Unit C

The constituent unit C is a constituent unit containing an acrylamide monomer having a sulfonic acid group and partially imparts hydrophilicity to the dispersion resin. Although not particularly limited, the constituent unit C is aligned on the side opposite to the surface of the coloring material and thus can contribute to improvement in dispersibility.

Examples of the acrylamide monomer having a sulfonic acid group constituting the constituent unit C include, but are not particularly limited to, compounds represented by formula (1) below. Among these, 2-acrylamido-2-methylpropanesulfonic acid is more preferred. The use of such an acrylamide monomer tends to more improve the hydrophilicity of the dispersion resin, more improve re-dispersibility after solidification, and more decrease changes in the particle diameter and viscosity even when stored at a high temperature. These acrylamide monomers may be used alone or in combination of two or more.

$$CH_2=CONH-R-SO_3H \quad (1)$$

In the formula, R represents a linear, branched, or cyclic alkyl group having 1 to 6 carbon atoms.

The sulfonic acid group in the acrylamide monomer may form a salt. Examples of the salt include, but are not particularly limited to, alkali metal salts of potassium, sodium, and the like; alkaline-earth metal salts of calcium, magnesium, and the like; ammonium salts; and alkylamine salts.

The content of the constituent unit C relative to the total amount of the dispersion resin is preferably from 5 to 25 mol %, from 10 to 20 mol %, or from 12.5 to 17.5 mol %. When the content of the constituent unit C is within the range described above, there is a tendency to more improve the hydrophilicity of the dispersion resin, more improve re-dispersibility after solidification, and more improve the dispersion stability during storage in a high-temperature environment.

1.1.4. Weight-Average Molecular Weight and Molecular Weight Distribution

The weight-average molecular weight of the dispersion resin is from 10,000 to 100,000, preferably from 20,000 to 80,000, from 30,000 to 60,000, or from 30,000 to 50,000. When the weight-average molecular weight of the dispersion resin is 10,000 or more, there is a tendency to improve adsorptivity of the dispersion resin to the coloring material and more improve the dispersion stability. When the molecular weight is 100,000 or less, there is a tendency to decrease the viscosity of the dispersion liquid and improve ejection reliability.

In addition, the molecular weight distribution (Mw/Mn) of the dispersion resin is preferably from 1.0 to 3.0, from 1.0 to 2.5, or from 1.0 to 2.0. When the molecular weight distribution of the dispersion resin is within the range described above, variation in the molecular weight of the dispersion resin is decreased, and a dispersion liquid containing a large amount of dispersion resin having predetermined dispersion performance can be obtained. This tends to decrease variation in quality of the dispersion liquid, thereby facilitating quality control. In addition, such a relatively narrow molecular weight distribution can be achieved by living radial polymerization described later or the like.

The weight-average molecular weight and molecular weight distribution can be measured by a known method using chromatography. More specifically, a method described in examples can be used for measurement.

1.1.5. Production Method

The dispersion resin of the present embodiment can be produced by sequentially copolymerizing the hydrophobic monomer and the acrylamide monomer. The polymerization reaction is not particularly limited, but for example, radical polymerization, particularly living radical polymerization, can be used.

1.2. Water

Examples of the water contained in the ink composition according to the present embodiment include, but are not particularly limited to, ion exchange water, pure water, ultrafiltered water, reverse osmosis water, distilled water, and the like.

The content of water relative to the total amount of the dispersion liquid is preferably from 60% to 90% by mass, from 70% to 90% by mass, or from 80% to 90% by mass.

1.3. Coloring Material

The coloring material is not particularly limited, but for example, a disperse dye or a pigment can be used. Among these, the disperse dye is more preferred. These coloring materials may be used alone or in combination of two or more.

Usable examples of the disperse dye include, but are not particularly limited to, known dyes such as C. I. Disperse Yellow, C. I. Disperse Orange, C. I. Disperse Blue, C. I. Disperse Violet, C. I. Disperse Black, and the like.

Examples of an inorganic pigment include, but are not particularly limited to, carbon black (C. I. Pigment Black 7) such as furnace black, lamp black, acetylene black, channel black, and the like, iron oxide, and titanium oxide.

Examples of an organic pigment include, but are not particularly limited to, a quinacridone pigment, a quinacridone-quinone pigment, a dioxazine pigment, a phthalocyanine pigment, an anthrapyrimidine pigment, an anthanthrone pigment, an indanthrone pigment, a flavanthrone pigment, a perylene pigment, a diketopyrrolopyrrole pigment, a perinone pigment, a quinophthalone pigment, an anthraquinone pigment, a thioindigo pigment, a benzimidazolone pigment, an isoindolinone pigment, an azomethine pigment, and an azo pigment.

The content of the coloring material relative to the total amount of the dispersion liquid is preferably 7.5% to 30% by mass, from 8.0% to 20% by mass, or from 8.5% to 15% by mass.

1.4. pH Adjuster

The dispersion liquid may further contain a pH adjuster. Examples of the pH adjuster include, but are not particularly limited to, inorganic acids (for example, sulfuric acid, hydrochloric acid, nitric acid, and the like), inorganic bases (for example, lithium hydroxide, sodium hydroxide, potassium hydroxide, ammonia, and the like), organic bases (for example, triethanolamine, diethanolamine, monoethanolamine, and tripropanolamine), organic acids (for example, adipic acid, citric acid, succinic acid, and the like), and the like. These pH adjusters may be used alone or in combination of two or more.

2. Ink Composition for Ink Jet Recording

An ink composition for ink jet recording (also simply referred to as an "ink composition") according to the present embodiment contains the dispersion liquid, a surfactant, and a water-soluble organic solvent and may, if required, contain other components. The expression "for ink jet recording" represents use by an ink jet method of ejecting ink droplets from nozzles of an ink jet head.

2.1. Dispersion Liquid

The dispersion liquid is as described above. The content of the dispersion resin added together with the dispersion liquid to the ink composition relative to the total amount of the ink composition is preferably from 0.1% to 3.0% by mass, from 0.3% to 2.0% by mass, or from 0.5% to 1.5% by mass. When the content of the dispersion resin is within the range described above, there is a tendency to more improve re-dispersibility after solidification and more improve dispersion stability during storage in a high-temperature environment.

The content of the coloring material added together with the dispersion liquid to the ink composition relative to the total amount of the ink composition is preferably from 1.0% to 7.0% by mass, from 1.5% to 6.0% by mass, or from 2.5% to 4.5% by mass. When the content of the coloring material is within the range described above, there is a tendency to more improve re-dispersibility after solidification and more improve dispersion stability during storage in a high-temperature environment.

The content of the dispersion resin relative to 100 parts by mass of the coloring material in the ink composition is preferably from 10 to 80 parts by mass, from 15 to 70 parts by mass, or from 25 to 60 parts by mass. When the content of the dispersion resin is within the range described above, there is a tendency to more improve re-dispersibility after solidification and more improve dispersion stability during storage in a high-temperature environment.

2.2. Surfactant

Examples of the surfactant include, but are not particularly limited to, an acetylene glycol-based surfactant, a fluorine-based surfactant, and a silicone-based surfactant.

The acetylene glycol-based surfactant is not particularly limited, but is, for example, preferably one or more selected from 2,4,7,9-tetramethyl-5-decyne-4,7-dol, alkylene oxide adducts of 2,4,7,9-tetramethyl-5-decyne-4,7-diol, 2,4-dimethyl-5-decyne-4-ol, and alkylene oxide adducts of 2,4-dimethyl-5-decyne-4-ol.

Examples of the fluorine-based surfactant include, but are not particularly limited to, perfluoroalkylsulfonate salts, perfluoroalkylcarboxylate salts, perfluoroalkylphosphate esters, perfluoroalkylethylene oxide adducts, perfluoroalkylbetaine, and perfluoroalkylamine oxide compounds.

Examples of the silicone-based surfactant include a polysiloxane-based compound, polyether-modified organosiloxane, and the like.

The content of the surfactant relative to the total amount of the ink composition is preferably from 0.1% to 3.0% by mass or from 0.1% to 1.0% by mass.

2.3. Water-Soluble Organic Solvent

Examples of the water-soluble organic solvent include, but are not particularly limited to, glycerin; glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, and the like; glycol monoethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, and the like; nitrogen-containing solvents such as 2-pyrrolidone, N-methyl-2-pyrrolidone, N-ethyl-2-pyrrolidone, and the like; and alcohols such as methanol, ethanol, n-propyl alcohol, isopropyl alcohol, n-butanol, 2-butanol, tert-butanol, iso-butanol, n-pentanol, 2-pentanol, 3-pentanol, tert-pentanol, and the like. Among these, glycols are preferred, and diethylene glycol and 1,2-hexanediol are more preferred. The water-soluble organic solvents may be used alone or in combination of two or more.

The content of the water-soluble organic solvent relative to the total amount of the ink composition is preferably from 5.0% to 30% by mass or from 10% to 20% by mass. When the content of the water-soluble organic solvent is within the range described above, there is a tendency to more improve re-dispersibility after solidification and more improve dispersion stability during storage in a high-temperature environment.

2.4. Water

Examples of water include, but are not particularly limited to, those described for the dispersion liquid.

The content of the water relative to the total amount of the ink composition is preferably from 60% to 90% by mass or from 70% to 85% by mass. When the content of the water is within the range described above, there is a tendency to more improve re-dispersibility after solidification and more improve dispersion stability during storage in a high-temperature environment.

2.5. pH Adjuster

The ink composition may further contain a pH adjuster. Examples of the pH adjuster include, but are not particularly limited to, those described for the dispersion liquid. The pH adjuster may be derived from the dispersion liquid and mixed in the ink composition or may be separately added when the ink composition is prepared.

The content of the pH adjuster relative to the total amount of the ink composition is preferably from 0.1% to 2.0% by mass or from 0.5% to 1.5% by mass.

2.6. Other Resin

The ink composition may further contain a resin other than the dispersion resin. Examples of the other resin include, but are not particularly limited to, an anionic resin, a cationic resin, and a nonionic resin. By containing such a resin, the coloring material can be fixed to a recording medium.

Examples of the cationic resin include, but are not particularly limited to, starch derivatives such as cation starch and the like, a cationic urethane-based resin, a cationic olefin-based resin, and a cationic allylamine-based resin.

Examples of the anionic resin include cellulose derivatives such as a carboxymethyl cellulose salt, viscose, and the like; and natural resins such as an alginate salt, gum arabic, gum traganth, a ligninsulfonate salt, and the like.

Examples of the nonionic resin include, but are not particularly limited to, an acrylic resin, a styrene-acrylic resin, a urethane-based resin, an ester-based resin, an olefinic resin, and a vinyl acetate-based resin.

The content of the other resin relative to the total amount of the ink composition is preferably from 0.1% to 2.0% by mass or from 0.5% to 1.5% by mass.

EXAMPLES

The present disclosure is described in further detail below by using examples and comparative examples. The present disclosure is not limited to the examples below.

1. Synthesis of Copolymer 1.1. Production Example 1

In a 200 mL-volume two-neck flask with a stirring bar and Dimroth condenser set thereto, 17 parts by mass of styrene, 7 parts by mass of 2-acrylamido-2-methylpropanesulfonic acid, 3.4 parts by mass of itaconic acid, 0.3 parts by mass of 2-{[(carboxymethyl)sulfanylthiocarbonyl] sulfanyl}propanoic acid (CSPA), and 0.3 parts by mass of azobisisobutyronitrile (AIBN) were placed and dissolved in 72 parts by mass of isopropyl alcohol.

Then, living radical polymerization reaction was performed for 22 hours by heating to 75° C. in a nitrogen atmosphere. After the termination of reaction, the reaction product was dropped to 1 L of pure water and ultrafiltered with a filer having a cut-off molecular weight of 100,000. The concentrated liquid was frozen with liquid nitrogen and freeze-dried overnight, producing 15 parts by mass of light-yellow powdery dispersion resin 1 as a copolymer. The weight-average molecular weight of the resultant dispersion resin 1 was 32000. In addition, all the reagents used as described above were products manufactured by Tokyo Chemical Industry Co., Ltd.

1.2. Production Examples 2 to 10

Dispersion resins 2 to 10 were synthesized by the same method as in Production Example 1 except that the type and amount of each of the monomers used were changed so as to obtain the dispersion resins shown in Table 1.

1.3. Weight-Average Molecular Weight and Molecular Weight Distribution

The weight-average molecular weight and molecular weight distribution (Mw/Mn) of each of the dispersion resins produced as described above were measured by chromatography. The conditions are shown below.

Measurement Conditions
Apparatus name: HLC8320GPC (Tosoh Corporation)
Guard column: Super AW-L
Column: Super AW3000
Colum temperature: 25° C.
Eluent: dimethylacetamide
Flow rate: 0.6 mL/min
Detector: RI

TABLE 1

|  |  | Constituent unit A | | Constituent unit B | | Constituent unit C | | | |
| --- | --- | --- | --- | --- | --- | --- | --- | --- | --- |
|  |  | Monomer | Ratio (mol %) | Monomer | Ratio (mol %) | Monomer | Ratio (mol %) | Mw | Mw/Mn |
| Production Example 1 | Dispersion resin 1 | Styrene | 80 | Itaconic acid | 4 | ATBS | 16 | 32,000 | 1.70 |
| Production Example 2 | Dispersion resin 2 | Benzyl acrylate | 81 | Itaconic acid | 7 | ATBS | 12 | 59,000 | 1.60 |
| Production Example 3 | Dispersion resin 3 | Styrene | 45 | Fumaric acid | 35 | ATBS | 20 | 25,000 | 2.20 |
| Production Example 4 | Dispersion resin 4 | Benzyl acrylate | 70 | Fumaric acid | 20 | ATBS | 10 | 80,000 | 2.40 |

TABLE 1-continued

|  |  | Constituent unit A | | Constituent unit B | | Constituent unit C | | | |
|---|---|---|---|---|---|---|---|---|---|
|  |  | Monomer | Ratio (mol %) | Monomer | Ratio (mol %) | Monomer | Ratio (mol %) | Mw | Mw/Mn |
| Production Example 5 | Dispersion resin 5 | Styrene | 84 | Acrylic acid | 6 | ATBS | 10 | 24,000 | 1.82 |
| Production Example 6 | Dispersion resin 6 | Styrene | 55 | Itaconic acid | 45 | — | — | 12,000 | 3.80 |
| Production Example 7 | Dispersion resin 7 | Styrene | 80 | Itaconic acid | 4 | ATBS | 16 | 120,000 | 1.70 |
| Production Example 8 | Dispersion resin 8 | Styrene | 55 | Acrylic acid | 45 | — | — | 12,000 | 3.80 |
| Production Example 9 | Dispersion resin 9 | Styrene | 35 | Itaconic acid | 35 | ATBS | 30 | 32,000 | 1.70 |
| Production Example 10 | Dispersion resin 10 | Styrene | 84 | Itaconic acid | 6 | ATBS | 10 | 6,000 | 1.70 |

*ATBS (registered trademark): 2-Acrylamido-2-methylpropanesulfonic acid

2. Preparation of Varnish Solution

In a 1-L eggplant-shaped flask with a stirring bar and Dimroth condenser set thereto, 10 parts by mass of the dispersion resin, 86 parts by mass of pure water, and 4 parts by mass of triethanolamine were added, heated to 80° C., and then stirred for 1 hour. Then, the resultant mixture was cooled to 25° C., preparing an aqueous solution used as a varnish solution.

3. Preparation of Dispersion Liquid

Added were 13 parts by mass of the varnish solution, 4 parts by mass of DISPERSE YELLOW 232 (DY232) as a water-insoluble coloring material, and 17 parts by mass of pure water. The resultant mixture was ground for 1 hour by a beads mill using 80 parts by mass of zirconia beads, preparing a dispersion liquid.

4. Preparation of Ink Composition

The dispersion liquid was mixed with other components so as to obtain the composition shown in Table 2, preparing each of the ink compositions. Table 2 also shows the composition of ink water used for evaluating re-dispersibility described later.

5. Evaluation 5.1. Re-Dispersibility

The ink composition prepared as described above was dropped on a slide glass and then solidified by drying. Then, the slide glass was dipped in a sample bottle containing ink water, and the re-dispersion behavior of a solid was confirmed by visual observation. This operation was performed with attention so that the ink water was not stirred or the like. The ink water represents not containing the coloring material and the dispersion resin shown in Table 2. The evaluation criteria of re-dispersibility are shown below.

Evaluation Criteria

A: The solid is completely dispersed in the ink water.

B: The solid is dispersed in the ink water.

C: Aggregates or precipitates are observed in the ink water.

5.2. Change in Particle Size Distribution (Dispersion Stability in Storage in High-Temperature Environment)

The ink composition prepared as described above was placed in a sample bottle and allowed to stand at 60° C. for 5 days. The volume-based cumulative 50% particle diameter (D50) of the ink composition was measured by a dynamic light scattering method before and after being allowed to stand, and a change in cumulative 50% particle diameter before and after being allowed to stand was confirmed. The measurement apparatus used was Microtrac UPA 150 (trade name manufactured by Microtrac Inc). A change in particle size distribution was determined based on the obtained measurement results.

Evaluation Criteria

A: An increase in D50 is less than 8%.

B: An increase in D50 is 8% or more and less than 20%.

C: An increase in D50 is 20% or more.

TABLE 2

|  |  | Example | | | | Comparative Example | | | | | | Ink water |
|---|---|---|---|---|---|---|---|---|---|---|---|---|
|  |  | 1 | 2 | 3 | 4 | 1 | 2 | 3 | 4 | 5 | 6 | |
| Coloring material | DY. 232 | 3 | 3 | 3 | 3 | 3 | 3 | 3 | 3 | 3 | 3 | |
| Dispersion resin | Dispersion resin 1 | 1 | | | | | | | | | | |
|  | Dispersion resin 2 | | 1 | | | | | | | | | |
|  | Dispersion resin 3 | | | 1 | | | | | | | | |
|  | Dispersion resin 4 | | | | 1 | | | | | | | |
|  | Dispersion resin 5 | | | | | 1 | | | | | | |
|  | Dispersion resin 6 | | | | | | 1 | | | | | |
|  | Dispersion resin 7 | | | | | | | 1 | | | | |
|  | Dispersion resin 8 | | | | | | | | 1 | | | |
|  | Dispersion resin 9 | | | | | | | | | 1 | | |
|  | Dispersion resin 10 | | | | | | | | | | 1 | |

TABLE 2-continued

|  |  | Example | | | | Comparative Example | | | | | | Ink water |
|---|---|---|---|---|---|---|---|---|---|---|---|---|
|  |  | 1 | 2 | 3 | 4 | 1 | 2 | 3 | 4 | 5 | 6 |  |
| Surfactant | BYK-348 | 0.3 | 0.3 | 0.3 | 0.3 | 0.3 | 0.3 | 0.3 | 0.3 | 0.3 | 0.3 | 0.3 |
| Water-soluble organic solvent | Diethylene glycol | 10 | 10 | 10 | 10 | 10 | 10 | 10 | 10 | 10 | 10 | 10 |
|  | 1,2-Hexanediol | 3 | 3 | 3 | 3 | 3 | 3 | 3 | 3 | 3 | 3 | 3 |
| Other resin | Carboxymethyl cellulose sodium salt | 1 | 1 | 1 | 1 | 1 | 1 | 1 | 1 | 1 | 1 | 1 |
| pH adjuster | Triethanolamine | 1 | 1 | 1 | 1 | 1 | 1 | 1 | 1 | 1 | 1 | 1 |
| Water | Ion exchange water | Balance | Balance | Balance | Balance | Balance | Balance | Balance | Balance | Balance | Balance | Balance |
|  | Total | 100 | 100 | 100 | 100 | 100 | 100 | 100 | 100 | 100 | 100 | 100 |
| Evaluation | Re-dispersibility | A | B | B | B | C | C | C | C | C | C | — |
|  | Change in particle size distribution | A | B | B | B | C | C | B | C | C | C | — |

\* All numerals in the table are by "% by mass".

Carboxymethyl cellulose sodium salt: manufactured by Fujifilm Wako Pure Chemical Corporation
BYK-348: Silicone-based surfactant, manufacture by BYK Chemie Co., Ltd.

As described above, it is found that as compared with the comparative examples, the ink compositions of the examples using the dispersion liquid of the present disclosure are excellent in re-dispersibility and dispersion stability in storage in a high-temperature environment.

What is claimed is:

1. A dispersion liquid comprising:
water;
a coloring material; and
a dispersion resin that disperses the coloring material, wherein
the coloring material is a disperse dye;
the dispersion resin has a constituent unit A containing a hydrophobic monomer, a constituent unit B containing an unsaturated aliphatic dicarboxylic acid monomer, and a constituent unit C containing an acrylamide monomer having a sulfonic acid group;
the weight-average molecular weight of the dispersion resin is from 10,000 to 100,000;
the content of the constituent unit A is 40 mol % or more relative to the total amount of the dispersion resin; and
the content of the constituent unit B is 4 mol % or more relative to the total amount of the dispersion resin.

2. The dispersion liquid according to claim 1, wherein the molecular weight distribution of the dispersion resin is from 1.0 to 3.0.

3. The dispersion liquid according to claim 1, wherein the content of the constituent unit A relative to the total amount of the dispersion resin is from 40 to 90 mol %.

4. The dispersion liquid according to claim 1, wherein the content of the constituent unit B relative to the total amount of the dispersion resin is from 4 to 37 mol %.

5. The dispersion liquid according to claim 1, wherein the content of the constituent unit C relative to the total amount of the dispersion resin is from 10 to 20 mol %.

6. The dispersion liquid according to claim 1, wherein the content of the coloring material relative to the total amount of the dispersion liquid is from 7.5% to 30% by mass.

7. The dispersion liquid according to claim 1, wherein the content of the dispersion resin relative to the total amount of the dispersion liquid is from 2.5% to 10% by mass.

8. An ink composition for ink jet recording, comprising:
the dispersion liquid according to claim 1;
a surfactant; and
a water-soluble organic solvent.

* * * * *